United States Patent
Mei

(10) Patent No.: US 11,147,038 B2
(45) Date of Patent: Oct. 12, 2021

(54) NOTIFICATION MESSAGE PROCESSING METHOD AND TERMINAL

(71) Applicant: Huawei Technologies Co., Ltd., Shenzhen (CN)

(72) Inventor: Jingqing Mei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/650,702

(22) PCT Filed: Sep. 26, 2017

(86) PCT No.: PCT/CN2017/103353
§ 371 (c)(1),
(2) Date: Mar. 25, 2020

(87) PCT Pub. No.: WO2019/061009
PCT Pub. Date: Apr. 4, 2019

(65) Prior Publication Data
US 2020/0314797 A1 Oct. 1, 2020

(51) Int. Cl.
*H04W 68/00* (2009.01)
*H04W 68/02* (2009.01)
*H04L 29/08* (2006.01)

(52) U.S. Cl.
CPC .............. *H04W 68/02* (2013.01); *H04L 67/26* (2013.01)

(58) Field of Classification Search
CPC ..... H04W 68/02; H04W 4/12; H04W 72/048; H04L 67/26; H04L 12/189; H04L 65/1006
USPC ........... 455/458, 411, 466, 406, 412.1, 414.1
See application file for complete search history.

(56) References Cited

U.S. PATENT DOCUMENTS

| | | | |
|---|---|---|---|
| 6,778,834 B2 * | 8/2004 | Laitinen | H04L 29/06 455/450 |
| 7,295,862 B2 * | 11/2007 | Laitinen | H04L 29/06 455/412.1 |
| 7,308,269 B2 * | 12/2007 | Laitinen | H04L 29/06 340/7.52 |
| 7,415,284 B2 * | 8/2008 | Hoover | H04M 3/533 455/412.1 |

(Continued)

FOREIGN PATENT DOCUMENTS

| CN | 102457619 A | 5/2012 |
|---|---|---|
| CN | 103401889 A | 11/2013 |

(Continued)

OTHER PUBLICATIONS

ZTE et al., "Discussion on SUL carrier", 3GPP TSG RAN WG1 Meeting #99bis, R2-1711841, Prague, Czech, Oct. 9-13, 2017, 6 pages.

(Continued)

*Primary Examiner* — Marceau Milord
(74) *Attorney, Agent, or Firm* — Slater Matsil, LLP

(57) ABSTRACT

Embodiments of this application provide a notification message processing method and a mobile terminal. A technical solution provided in the embodiments of this application is as follows: obtaining a login status of a target account of a target application; if the login status of the target account is non-logged-in, obtaining a first notification message corresponding to the target account of the target application; and clearing the first notification message.

18 Claims, 12 Drawing Sheets

(56) References Cited

U.S. PATENT DOCUMENTS

| | | | | |
|---|---|---|---|---|
| 8,131,281 | B1* | 3/2012 | Hildner | H04L 41/0806 455/418 |
| 8,335,831 | B2* | 12/2012 | Fan | H04L 12/1859 709/206 |
| 8,527,013 | B2* | 9/2013 | Guba | H04M 1/72463 455/569.2 |
| 8,595,810 | B1* | 11/2013 | Ben Ayed | H04L 63/0815 726/8 |
| 8,613,070 | B1* | 12/2013 | Borzycki | H04L 67/10 726/8 |
| 8,769,063 | B2* | 7/2014 | Barton | H04L 63/102 709/221 |
| 8,788,608 | B2* | 7/2014 | Fan | H04L 65/1006 709/207 |
| 8,799,994 | B2* | 8/2014 | Barton | H04W 12/37 726/1 |
| 8,806,570 | B2* | 8/2014 | Barton | G06F 21/72 726/1 |
| 9,014,661 | B2* | 4/2015 | deCharms | G06Q 50/265 455/404.2 |
| 9,444,901 | B2* | 9/2016 | Fan | H04L 65/1006 |
| 9,537,812 | B2* | 1/2017 | Lewis | G06F 9/542 |
| 9,794,363 | B2* | 10/2017 | Fan | H04L 67/26 |
| 10,298,749 | B2* | 5/2019 | Mumick | H04M 15/852 |
| 10,313,292 | B2* | 6/2019 | Nambiar | H04L 51/043 |
| 10,638,279 | B2* | 4/2020 | Ryder | G06F 21/554 |
| 10,757,211 | B2* | 8/2020 | Fan | H04L 12/1859 |
| 10,798,198 | B2* | 10/2020 | Wang | H04L 67/12 |
| 10,887,410 | B1 | 1/2021 | Nambiar | H04L 51/26 |
| 2002/0160805 | A1* | 10/2002 | Laitinen | H04L 67/26 455/550.1 |
| 2004/0219882 | A1* | 11/2004 | Laitinen | H04L 67/306 455/41.2 |
| 2004/0237109 | A1* | 11/2004 | Laitinen | H04L 29/06 725/62 |
| 2004/0254993 | A1* | 12/2004 | Mamas | H04L 69/329 709/206 |
| 2005/0255882 | A1* | 11/2005 | Tsao | H04M 1/72448 455/556.1 |
| 2006/0179115 | A1* | 8/2006 | Garcia-Martin | H04L 67/303 709/217 |
| 2011/0252240 | A1* | 10/2011 | Freedman | H04L 63/0823 713/169 |
| 2012/0214521 | A1* | 8/2012 | Preston | G06Q 40/02 455/466 |
| 2012/0250520 | A1 | 10/2012 | Chen et al. | |
| 2014/0378099 | A1 | 12/2014 | Huang et al. | |
| 2015/0188871 | A1* | 7/2015 | Lewis | H04L 51/24 709/207 |
| 2016/0316440 | A1 | 10/2016 | Dinan | |
| 2017/0085706 | A1 | 3/2017 | Kim et al. | |
| 2017/0171321 | A1 | 6/2017 | Gao et al. | |
| 2017/0180502 | A1* | 6/2017 | Lewis | G06F 9/542 |
| 2017/0257757 | A1 | 9/2017 | Huang et al. | |

FOREIGN PATENT DOCUMENTS

| | | |
|---|---|---|
| CN | 104333563 A | 2/2015 |
| CN | 104471920 A | 3/2015 |
| CN | 104869239 A | 8/2015 |
| CN | 105491048 A | 4/2016 |
| CN | 105721282 A | 6/2016 |
| CN | 105721389 A | 6/2016 |
| CN | 105893827 A | 8/2016 |
| CN | 105981356 A | 9/2016 |
| CN | 106155696 A | 11/2016 |
| CN | 106341365 A | 1/2017 |
| CN | 106648303 A | 5/2017 |
| CN | 106657329 A | 5/2017 |
| JP | 2013516917 A | 5/2013 |
| JP | 2014510457 A | 4/2014 |
| JP | 2016181937 A | 10/2016 |
| JP | 2016531531 A | 10/2016 |
| JP | 2017017728 A | 1/2017 |
| WO | 2014201647 A1 | 12/2014 |
| WO | 2016017717 A1 | 2/2016 |
| WO | 2017097047 A1 | 6/2017 |

OTHER PUBLICATIONS

CMCC, "Discussion on design of Msg2 for SUL", 3GPP TSG RAN WG1 Meeting 90bis, R1-1717891, Prague, CZ, Oct. 9-13, 2017, 2 pages.

* cited by examiner

NOTIFICATION MESSAGE PROCESSING METHOD AND TERMINAL

CROSS-REFERENCE TO RELATED APPLICATIONS

This application is a national stage of International Application No. PCT/CN2017/103353, filed on Sep. 26, 2017 which is hereby incorporated by reference in its entirety.

TECHNICAL FIELD

Embodiments of this application relate to the field of terminal technologies, and in particular, to a notification message processing method and a terminal.

BACKGROUND

With the development of science and technology, a terminal plays an increasingly important role in people's life. Various applications may be installed on the terminal, and these applications may push notification messages to the terminal. When receiving the notification messages pushed by the applications, the terminal may load the notification messages to a notification bar, to display the notification messages in the notification bar.

Currently, a third-party server corresponding to each application is connected to a push server of a unified push service provider (such as Apple and Google). The push server sends the notification messages to the terminal. The notification messages carry parameters such as an identity ID of a target application, push content, and a display manner.

During a push process, if an account on the application is logged out, the pushed notification message is usually not canceled. Therefore, user privacy information may be exposed and user information security cannot be ensured.

SUMMARY

Embodiments of this application provide a notification message processing method and a terminal, to effectively process a notification message corresponding to an account when the account on an application is logged out, thereby effectively ensuring user information security.

According to a first aspect of an embodiment of this application, a notification message processing method is provided, and the method includes:
  receiving, by a mobile terminal, a notification message of each installed application, and obtaining a login status of an application account of each application, so that the mobile terminal may obtain a login status of a target account of a target application in the applications; and when determining that the login status of the target account of the target application is non-logged-in, obtaining, by the mobile terminal, a first notification message corresponding to the target account of the target application, and clearing the first notification message corresponding to the target account of the target application.

In this embodiment, when clearing the notification message corresponding to the target account of the target application, the mobile terminal may obtain all notification messages corresponding to the target account, and then uniformly clear all the notification messages. Alternatively, after a notification message with a specified identity is obtained, the notification message with the specified identity may be cleared, and this operation is repeated until all the notification messages corresponding to the target account are cleared.

In this embodiment, when clearing the notification message corresponding to the target account of the target application, the mobile terminal may not display the notification message corresponding to the target account, and delete the notification message. Alternatively, the notification message corresponding to the target account may not be displayed, but the notification message is stored. A specific manner is not limited herein.

In a technical solution provided in this embodiment of this application, the notification message is a message, of an application program, that can be displayed to a user outside a conventional user interface (user interface, UI) of the application program, for example, in a notification bar, a lock screen interface, or a floating window. Generally, the notification message is displayed when the user does not read the notification message. If the user reads the notification message in the application program, the notification message is no longer displayed.

Attribute parameters of the notification message include information such as the identity of the notification message, an identity of an application to which the notification message belongs, notification content of the notification message, and a notification channel ID of the notification message. In addition, when the mobile terminal supports a notification channel group, the notification channel ID of the notification message belongs to a specific notification channel group ID. The identity of the notification message is used to distinguish and identify the notification message. The identity of the notification message may be distinguished in a plurality of manners, for example, by using a special digital code or a special field. Specifically, in a WeChat application, a user account "scting0120" corresponds to five notification messages, and identities of the five notification messages may be respectively 1, 2, 3, 4, and 5 in chronological order. The notification content of the notification message includes a sender name of the notification message, message content sent by the sender, a sending time, an application program name corresponding to the notification message, and the like. The notification channel is used to indicate a feature of a notification message of an account of an application program. For example, a notification channel of an account "scting0120" in the WeChat application may include displaying a notification message on a lock screen, importance of a notification message, and using a sound as an alert tone. The notification channel group includes a group of related notification channels, for example, all notification channels that belong to an account of an application program.

Optionally, when the mobile terminal obtains the login status of the target account of the target application, if the mobile terminal supports the notification channel group function, the mobile terminal further needs to obtain a notification channel group ID of the target application, and then determines the target account based on the notification channel group ID. The notification channel group ID is used to indicate the target account of the target application.

In the technical solution provided in this embodiment of this application, the mobile terminal can effectively process a notification message of a specified account, thereby protecting user privacy security and effectively reminding the user of a notification message of another account.

Optionally, to check the login status of each account of each application installed on the mobile terminal, the mobile terminal may use the following several possible implementations:

In a possible implementation, the mobile terminal receives a notification message that is used to indicate that the target account of the target application is logged out and that is sent by a push server. For example, if the user logs in to the WeChat application using a WeChat account A of the user on a new mobile phone after a mobile phone of the user is lost, the lost mobile phone receives a notification message "Your account is logged in on another device". In this case, the lost mobile phone performs semantic analysis on the notification message "Your account is logged in on another device", and may learn, through the semantic analysis, that the login status of the WeChat account A on the lost mobile phone is non-logged-in.

In another possible implementation, the mobile terminal detects, in a system, that the target account of the target application is in a non-logged-in state. For example, the mobile phone determines that the WeChat account of the user is non-logged-in by checking the login status of the WeChat account of the user in a system.

In another possible implementation, the mobile terminal receives instruction information used to indicate that the target account of the target application is logged out. For example, when the WeChat application is in a running state, if the user directly logs out of the WeChat account of the user on the mobile phone, the mobile phone may receive instruction information that is used to indicate that the WeChat account is logged out and that is sent by a service server corresponding to the WeChat to the mobile phone.

Optionally, the instruction information may also be provided by the mobile terminal. That is, when the WeChat application is in the running state, if the user directly logs out of the WeChat account of the user on the mobile phone, the mobile phone may directly locally obtain instruction information used to indicate that the WeChat account is logged out.

In the technical solution provided in this embodiment of this application, the mobile terminal checks the login status of the target account of the target application in a plurality of manners, so that it can be effectively ensured that the mobile terminal learns of the login status of the target account in different cases, and a related notification message is cleared in a timely manner, thereby ensuring user privacy security.

Optionally, the mobile terminal may clear the notification message corresponding to the target account in the following several manners:

In a possible implementation, the mobile terminal determines whether importance of the notification message is higher than preset importance. If yes, the mobile terminal clears the notification message. If no, the mobile terminal displays the notification message on a notification bar interface.

In this embodiment, the importance of the notification message may be determined based on the notification content of the notification message. If user privacy related to the notification content of the notification message is more important, the importance is higher. For example, if the notification content of the notification message relates to financial information such as a bank card, Alipay, and WeChat payment of the user, the importance is the highest. If the notification content of the notification message relates to information such as contact information and a home address of the user, the importance is second highest. If the notification message relates to messages such as an official account information recommendation, a version update prompt, or an account logout prompt, the importance is low. The importance may be preset based on an actual requirement.

In another possible implementation, the mobile terminal determines whether the content carried in the notification message meets preset content. If yes, the mobile terminal displays the notification message. If no, the mobile terminal clears the notification message.

In this embodiment, a notification message whose notification content is content such as the official account information recommendation, the version update prompt, the account logout prompt, or another functional content recommendation may be displayed, and a notification message that does not include the content is not displayed.

In the technical solution provided in this embodiment of this application, the mobile terminal clears the notification message based on the importance or the content. Therefore, on a premise of effectively ensuring user privacy, it can be ensured that the user can effectively learn of a functional message of the mobile terminal or the application, thereby improving user experience.

According to a second aspect, an embodiment of this application provides a mobile terminal. The mobile terminal has a same function as the mobile terminal in the foregoing method. The function may be implemented by hardware, or may be implemented by hardware executing corresponding software. The hardware or the software includes one or more modules corresponding to the function.

In one possible implementation, the mobile terminal includes:
  an obtaining module, configured to obtain a login status of a target account of a target application, where
  the obtaining module is further configured to: if the login status of the target account is non-logged-in, obtain a first notification message corresponding to the target account of the target application; and
  a clearing module, configured to clear the first notification message.

Optionally, the obtaining module is further configured to obtain a notification channel group identity ID of the target application, where the notification channel group ID is used to indicate the target account of the target application.

Optionally, the obtaining module is specifically configured to: receive a second notification message, where the second notification message is sent by a push server to the mobile terminal; and determine, based on the second notification message, that the login status of the target account of the target application is non-logged-in.

Optionally, based on the second notification message, the mobile terminal may obtain an analysis result by performing semantic analysis on notification content of the second notification message, and then determine, based on the analysis result, that the login status of the target account of the target application is non-logged-in.

Optionally, the obtaining module is specifically configured to detect, in an operating system of the mobile terminal, that the login status of the target account of the target application is non-logged-in.

Optionally, the obtaining module is specifically configured to receive instruction information, where the instruction information indicates that the login status of the target account of the target application is non-logged-in, and the instruction information is sent by an application server of the target application to the mobile terminal or is provided by the mobile terminal.

Optionally, the clearing module is further configured to: if importance of the notification message is higher than preset importance, trigger an action of clearing the notification message; and the mobile terminal further includes a display module, where the display module displays the notification message if the importance of the notification message is lower than or equal to the preset importance.

Optionally, the clearing module is further configured to: if importance of the notification message is higher than or equal to preset importance, trigger an action of clearing the notification message; and the display module is further configured to display the notification message if the importance of the notification message is lower than the preset importance.

Optionally, the clearing module is further configured to: if content of the notification message does not include preset information, trigger an action of clearing the notification message, where the preset information includes information used to indicate that the account is not logged in and information used to indicate an application program version update; and the display module is further configured to: if the content of the notification message includes the preset information, display the notification message.

Optionally, the clearing module is specifically configured to: skip displaying the notification message and delete the notification message;

or skip displaying the notification message and retain the notification message.

In this embodiment, when the target account of the target application is in a non-logged-in state, the mobile terminal clears the notification message corresponding to the target account, to effectively ensure that user privacy is not disclosed.

In another possible implementation, the mobile terminal includes:

one or more processors, a memory, and a display.

Optionally, the memory is configured to store a program instruction, and the processor invokes the program instruction stored in the memory, to perform a function performed by the mobile terminal in the foregoing method.

Specifically, the processor performs the following steps:
obtaining a login status of a target account of a target application;
if the login status of the target account is non-logged-in, obtaining a first notification message corresponding to the target account of the target application; and
clearing the first notification message.

Optionally, the processor is further configured to obtain a notification channel group identity ID of the target application, where the notification channel group ID is used to indicate the target account of the target application.

Optionally, the processor is specifically configured to: receive a second notification message, where the second notification message is sent by a push server to the mobile terminal; and determine, based on the second notification message, that the login status of the target account of the target application is non-logged-in.

Optionally, based on the second notification message, the processor may obtain an analysis result by performing semantic analysis on notification content of the second notification message, and then determine, based on the analysis result, that the login status of the target account of the target application is non-logged-in.

Optionally, the processor is specifically configured to detect, in an operating system of the mobile terminal, that the login status of the target account of the target application is non-logged-in.

Optionally, the processor is specifically configured to receive instruction information, where the instruction information indicates that the login status of the target account of the target application is non-logged-in, and the instruction information is sent by an application server of the target application to the mobile terminal or is provided by the mobile terminal.

Optionally, the processor is further configured to: if importance of the notification message is higher than preset importance, trigger an action of clearing the notification message; or the mobile terminal further includes a display, where the display displays the notification message if importance of the notification message is lower than or equal to preset importance.

Optionally, the processor is further configured to: if importance of the notification message is higher than or equal to preset importance, trigger an action of clearing the notification message; or the display is further configured to display the notification message if importance of the notification message is lower than preset importance.

Optionally, the clearing module is further configured to: if content of the notification message does not include preset information, trigger an action of clearing the notification message, where the preset information includes information used to indicate that the account is not logged in and information used to indicate an application program version update; or the display is further configured to display the notification message if content of the notification message includes preset information.

Optionally, the processor is specifically configured to: delete the notification message when the display does not display the notification message;

or retain the notification message by using the memory when the display does not display the notification message.

According to a third aspect, an embodiment of this application provides a computer-readable storage medium including an instruction. When the instruction is run on a computer, the computer executes the foregoing methods.

According to a fourth aspect, an embodiment of this application provides a computer program product including an instruction. When the computer program product is run on a computer, the computer performs the foregoing methods.

According to a fifth aspect, an embodiment of this application provides a system chip, where the system chip is applied to a mobile terminal, and the system chip includes:

at least one processor, a memory, an interface circuit, and a bus.

The at least one processor, the memory, and the interface circuit are coupled by using the bus.

The system chip interacts with the terminal by using the interface circuit, the memory stores a program instruction, and the at least one processor invokes the program instruction stored in the memory, to perform operations of the mobile terminal in the foregoing methods.

In the technical solution provided in this embodiment of this application, when the target account of the target application is in a non-logged-in state, the mobile terminal clears the notification message corresponding to the target account, to effectively ensure that user privacy is not disclosed.

DETAILED DESCRIPTION OF ILLUSTRATIVE EMBODIMENTS

Figure 1:
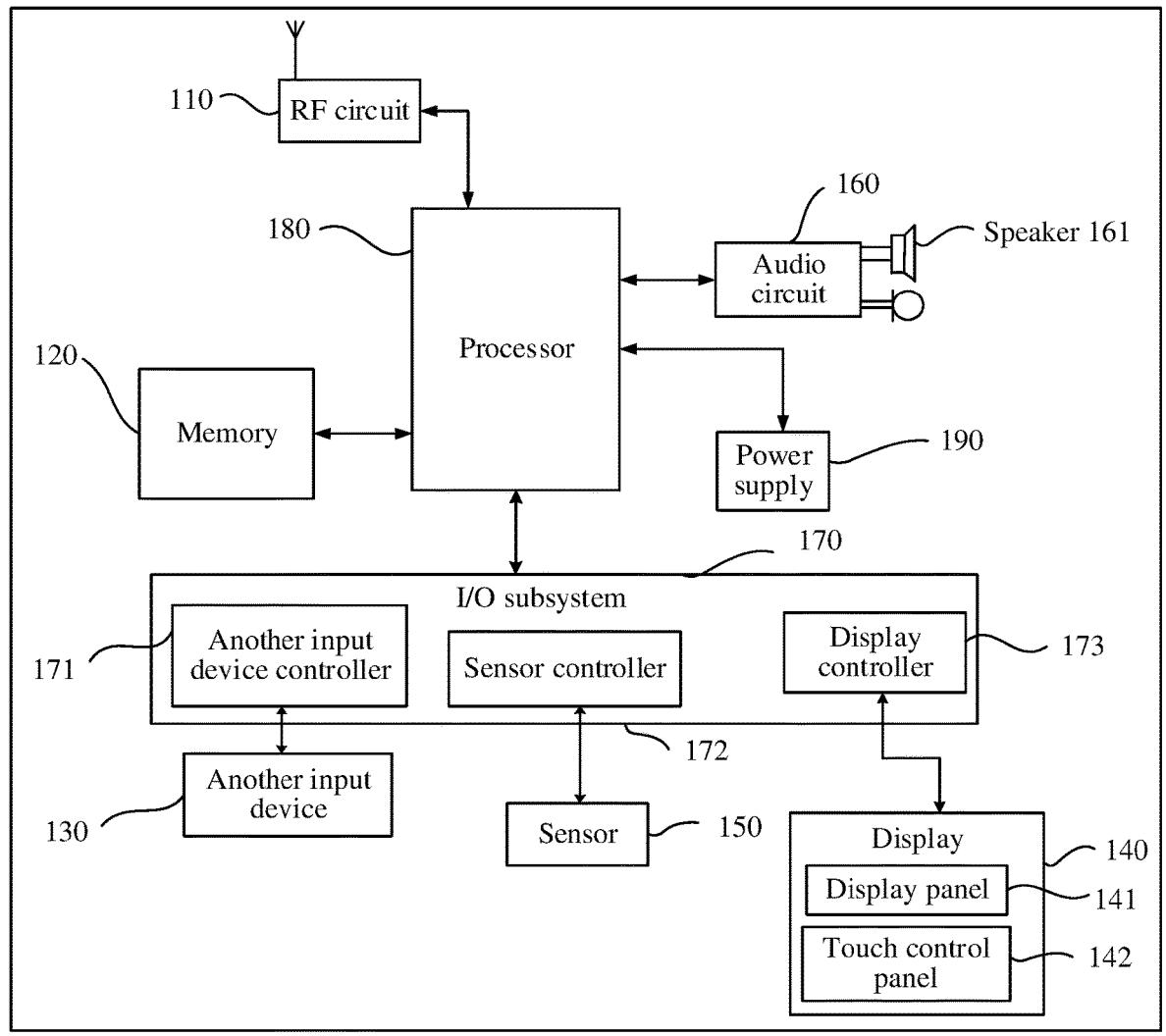
FIG. 1 is a schematic diagram of an embodiment of a mobile terminal according to an embodiment of this application.

Embodiments of this application provide a notification message processing method and a terminal, to effectively clear a notification message corresponding to an account when the account on an application is logged out, thereby effectively ensuring user information security.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Currently, various applications may be installed on an intelligent terminal, and these applications usually push notification messages to the terminal. When receiving the notification messages pushed by the applications, the terminal may load the notification messages to a notification bar, to display the notification messages in the notification bar. Currently, a notification message of each application is pushed in the following manner: A third-party server corresponding to each application is connected to a push server of a unified push service provider (such as Apple and Google). The push server sends the notification message to the terminal. The notification message carries parameters such as an identity ID of a target application, push content, and a display manner. During a push process, if an account on the application is logged out, the pushed notification message is usually not canceled and is still displayed in the notification bar. Therefore, user privacy information may be exposed and user information security cannot be ensured.

To resolve this problem, the embodiments of this application provide the following technical solution: The mobile terminal obtains a login status of a target account of a target application installed on the mobile terminal; if the mobile terminal determines that the login status of the target account of the target application is non-logged-in, the mobile terminal obtains a first notification message corresponding to the target account, and then the mobile terminal clears the first notification message.

A terminal 100 in the embodiments of this application may include a mobile phone, a tablet computer, a personal digital assistant (personal digital assistant, PDA), a point of sales (point of sales, POS), a vehicle-mounted computer, a TV, a wearable device, an AR device, a VR device, and the like.

For example, the terminal 100 is a mobile phone. FIG. 1 is a block diagram of a part of a structure of the mobile phone 100 related to the embodiments of this application. Referring to FIG. 1, the mobile phone 100 includes components such as a radio frequency (radio frequency, RF) circuit no, a memory 120, another input device 130, a display screen 140, a sensor 150, an audio frequency circuit 160, an I/O subsystem 170, a processor 180, and a power supply 190. A person skilled in the art may understand that, the mobile phone structure shown in FIG. 1 does not constitute a limitation to the mobile phone, and may include more or fewer components than those shown in the figure, or some components may be combined, or some components may be split, or a different component layout may be used. A person skilled in the aft may understand that, the display screen 140 belongs to a user interface (user interface, UI), and the mobile phone 100 may include more or fewer user interfaces than those shown in the figure.

The following describes in detail each component of the mobile phone 100 with reference to FIG. 1.

The RF circuit no may be configured to receive and send information, or receive and send signals during a call, and particularly, receive downlink information from a base station, and then send the downlink information to the processor 180 for processing. In addition, the RF circuit no sends related uplink data to the base station. Generally, an RF circuit includes but is not limited to an antenna, at least one amplifier, a transceiver, a coupler, a low noise amplifier (low noise amplifier, LNA), a duplexer, and the like. In addition, the RF circuit no may further communicate with a network and another device by using radio communication. The wireless communication may use any communications standard or protocol, including but not limited to a global system for mobile communications (global system of mobile communication, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short message service (short messaging service, SMS), and the like.

The memory 120 may be configured to store a software program and a module. The processor 180 performs each functional application and data processing of the mobile phone 100 by running the software program and the module that are stored in the memory 120. The memory 120 may mainly include a program storage area and a data storage area. The program storage area may store an operating system, an application program required for at least one function (such as an audio playback function or an image playback function), and the like. The data storage area may store data (such as audio data and a phone book) created based on usage of the mobile phone 100, and the like. In addition, the memory 120 may include a high-speed random access memory, and may further include a non-volatile memory, for example, at least one magnetic disk storage device, a flash memory, or another volatile solid-status storage device.

The another input device 130 may be configured to receive entered number or character information, and generate key signal input related to user setting and function control of the mobile phone loft Specifically, the another input device 130 may include but is not limited to one or more of the following: a physical keypad, a function key (for example, a volume control key or an on/off key), a trackball, a mouse, a joystick, an optical mouse (where the optical mouse is a touch-sensitive surface that does not display visual output, or is an extension of a touch-sensitive surface formed by a touchscreen), and the like. The another input device 130 is connected to another input device controller 171 of the I/O subsystem 170, and perform signal exchange with the processor 180 under control of the another input device controller 171.

The display screen 140 may be configured to display information entered by a user or information provided for a user and various menus of the mobile phone 100, and may further accept user input. Specifically, the display screen 140 may include a display panel 141 and a touch panel 142. The display panel 141 may be configured in a form of a liquid crystal display (liquid crystal display, LCD), an organic light-emitting diode (organic light-emitting diode, OLED), or the like. The touch panel 142, which is also referred to as a touchscreen, a touch-sensitive screen, or the like, may collect a touch operation or non-touch operation of a user on or near the touch panel (such as an operation of the user on the touch panel 142 or near the touch panel 142 by using any suitable object or accessory such as a finger or a stylus, or including a motion sensing operation of an operation type such as a single-point control operation or a multipoint control operation) and drive a corresponding connection apparatus based on a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and then sends the information to the processor 180, and can receive a command sent by the processor 180 and execute the command. In addition, the touch panel 142 may be implemented in a plurality of types such as a resistive type, a capacitive type, an infrared type, and a surface acoustic wave type; or the touch panel 142 may be implemented by using any technology to be developed in the future. Further, the touch panel 142 may cover the display panel 141. The user may perform, based on content displayed on the display panel 141 (the displayed content includes, but is not limited to a soft keyboard, a virtual mouse, a virtual key, and an icon), an operation on or near the touch panel 142 covered by the display panel 141. After detecting a touch operation performed on or near the touch panel 142, the touch panel 142 transfers the touch operation to the processor 180 by using the I/O subsystem 170, so as to determine a touch event type to determine user input. Then the processor 180 provides corresponding visual output on the display panel 141 by using the I/O subsystem 170 based on the touch event type and the user input. In FIG. 1, the touch control panel 142 and the display panel 141 are used as two independent components to implement input and input functions of the mobile phone 100. However, in some embodiments, the touch control panel 142 and the display panel 141 may be integrated to implement the input and output functions of the mobile phone 100.

The mobile phone wo may further include at least one sensor 150, for example, a light sensor, a motion sensor, and another sensor. Specifically, the optical sensor may include an ambient light sensor and a proximity sensor. The ambient light sensor may adjust luminance of the display panel 141 based on brightness of ambient light. The proximity sensor may switch off the display panel 141 and/or backlight when the mobile phone wo is moved to an ear. As a type of motion sensor, an accelerometer sensor may detect acceleration values in directions (usually three axes), may detect a value and a direction of gravity in a static state, and may be applied to an application for identifying a posture (such as screen switching between a landscape mode and portrait mode, a related game, and magnetometer posture calibration) of the mobile phone, a vibration-identification-related function (such as a pedometer and tapping), and the like. Other sensors that can be further disposed on the mobile phone 100 such as a gyroscope, a barometer, a hygrometer, a thermometer, and an infrared sensor are not described herein.

The audio circuit 160, a loudspeaker 161, and a microphone 162 can provide an audio interface between a user and the mobile phone 100. The audio circuit 160 may transmit, to the loudspeaker 161, a signal converted from received audio data. The loudspeaker 161 converts the signal to an audio signal and outputs the audio signal. In addition, the microphone 162 converts the collected audio signal to a signal. The audio circuit 160 receives the signal, converts the signal to audio data, and then outputs the audio data to the RF circuit 108, to send the audio data to, for example, another mobile phone, or outputs the audio data to the memory 120 for further processing.

The I/O subsystem 170 is configured to control an external input/output device, and may include the another input device controller 171, a sensor controller 172, and a display controller 173. Optionally, one or more another input control device controllers 171 receive a signal from the another input device 130 and/or send a signal to the another input device 130. The another input device 130 may include a physical button (a pressing button, a rocker button, and the like), a dial pad, a slider switch, a joystick, a click scroll wheel, or an optical mouse (the optical mouse is a touch-sensitive surface that does not display visible output, or an extension of a touch-sensitive surface formed by a touchscreen). It should be noted that the another input device controller 171 may be connected to any one or more of the foregoing devices. The display controller 173 in the I/O subsystem 170 receives a signal from the display screen 140 and/or sends a signal to the display screen 140. After the display screen 140 detects the user input, the display controller 173 converts the detected user input into interaction with a user interface object displayed on the display screen 140. To be specific, man-machine interaction is implemented. The sensor controller 172 may receive a signal from one or more sensors 150, and/or send a signal to one or more sensors 150.

The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, to perform overall monitoring on the mobile phone. Optionally, the processor 180 may include one or more processing units. Preferably, an application processor and a modem processor may be integrated into the processor 180. The application processor mainly processes an operating system, a user interface, an application program, and the like. The modem processor mainly processes radio communication. It may be understood that the modem processor may not be integrated into the processor 180.

The mobile phone wo further includes the power supply 190 (such as a battery) supplying power to the components. Preferably, the power supply may be logically connected to the processor 180 by using a power management system, to implement functions such as management of charging, discharging, and energy consumption by using the power management system.

The mobile phone 100 may further include a camera, a Bluetooth module, and the like although they are not shown. Details are not described herein.

Figure 2:
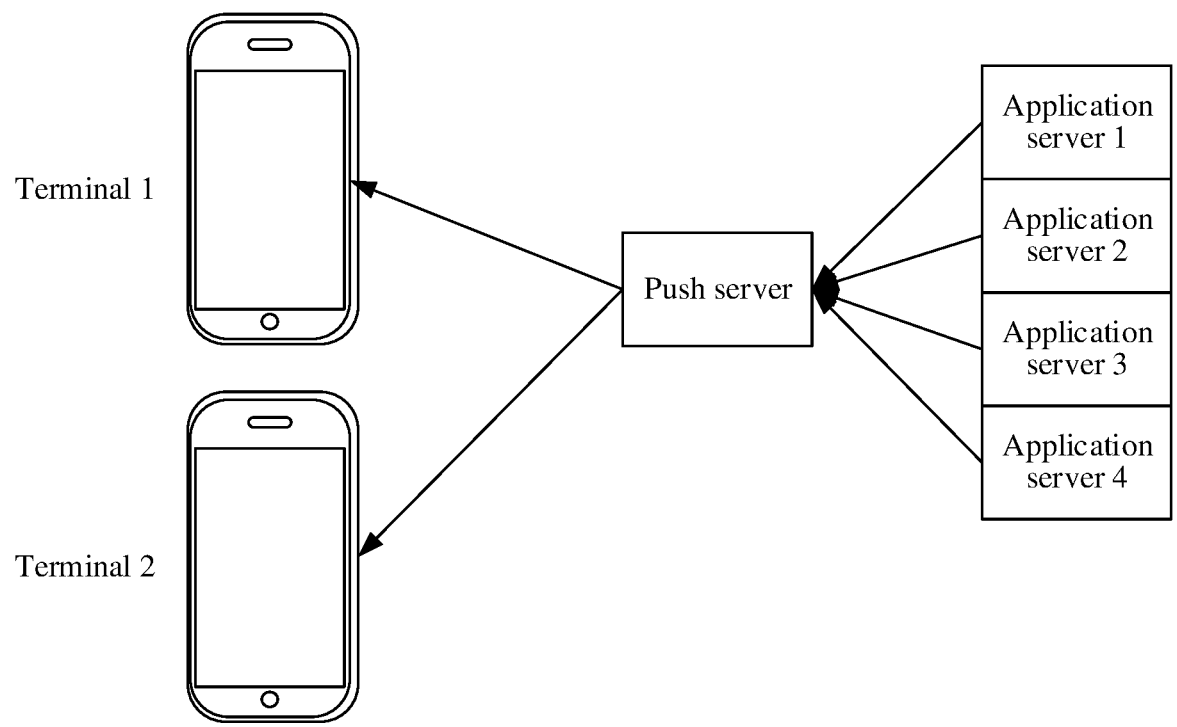
FIG. 2 is a schematic flowchart for pushing a notification message to a mobile terminal.
Figure 3:
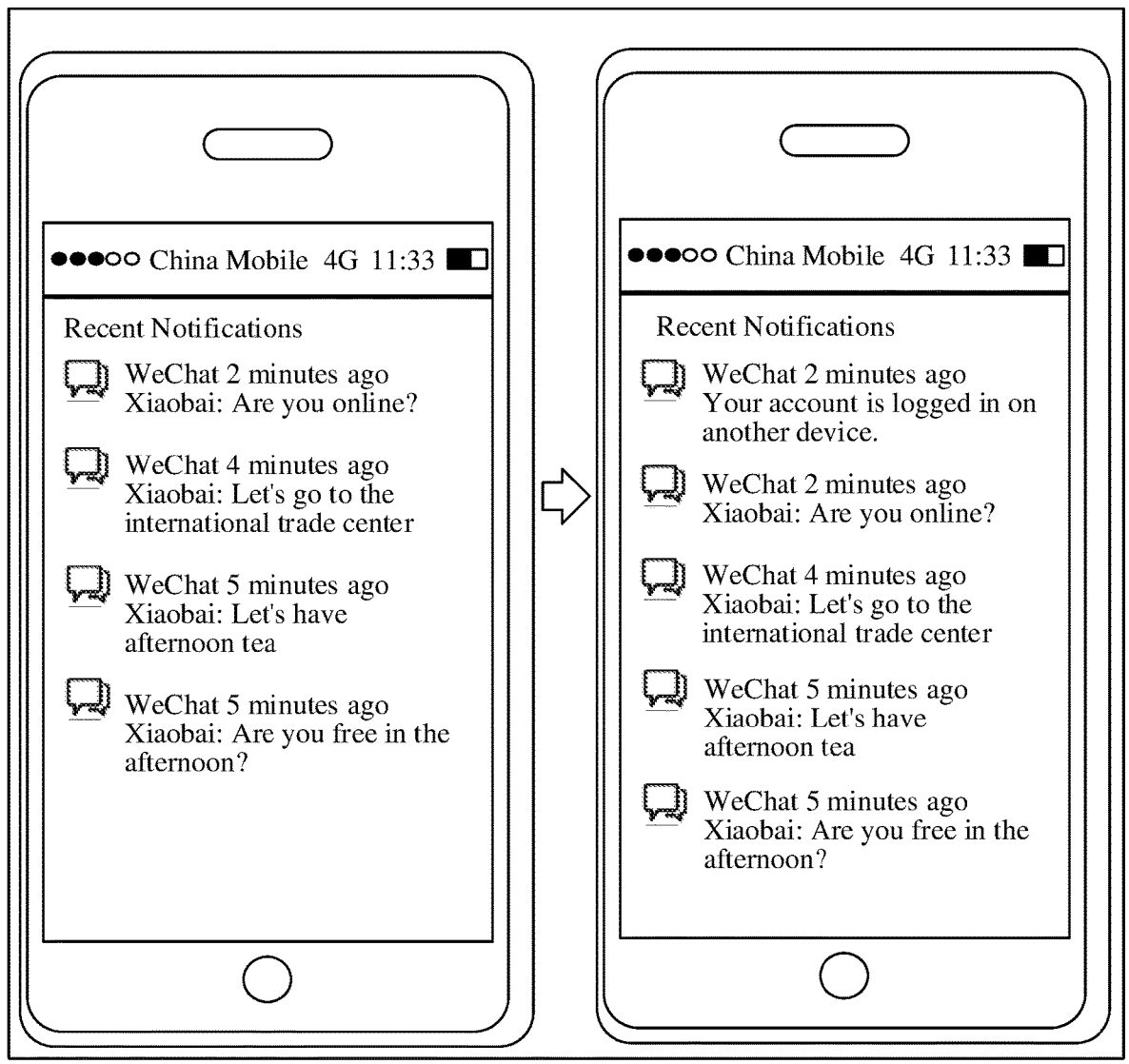
FIG. 3 is a schematic diagram of a current notification message processing method of a mobile terminal.
Figure 4:
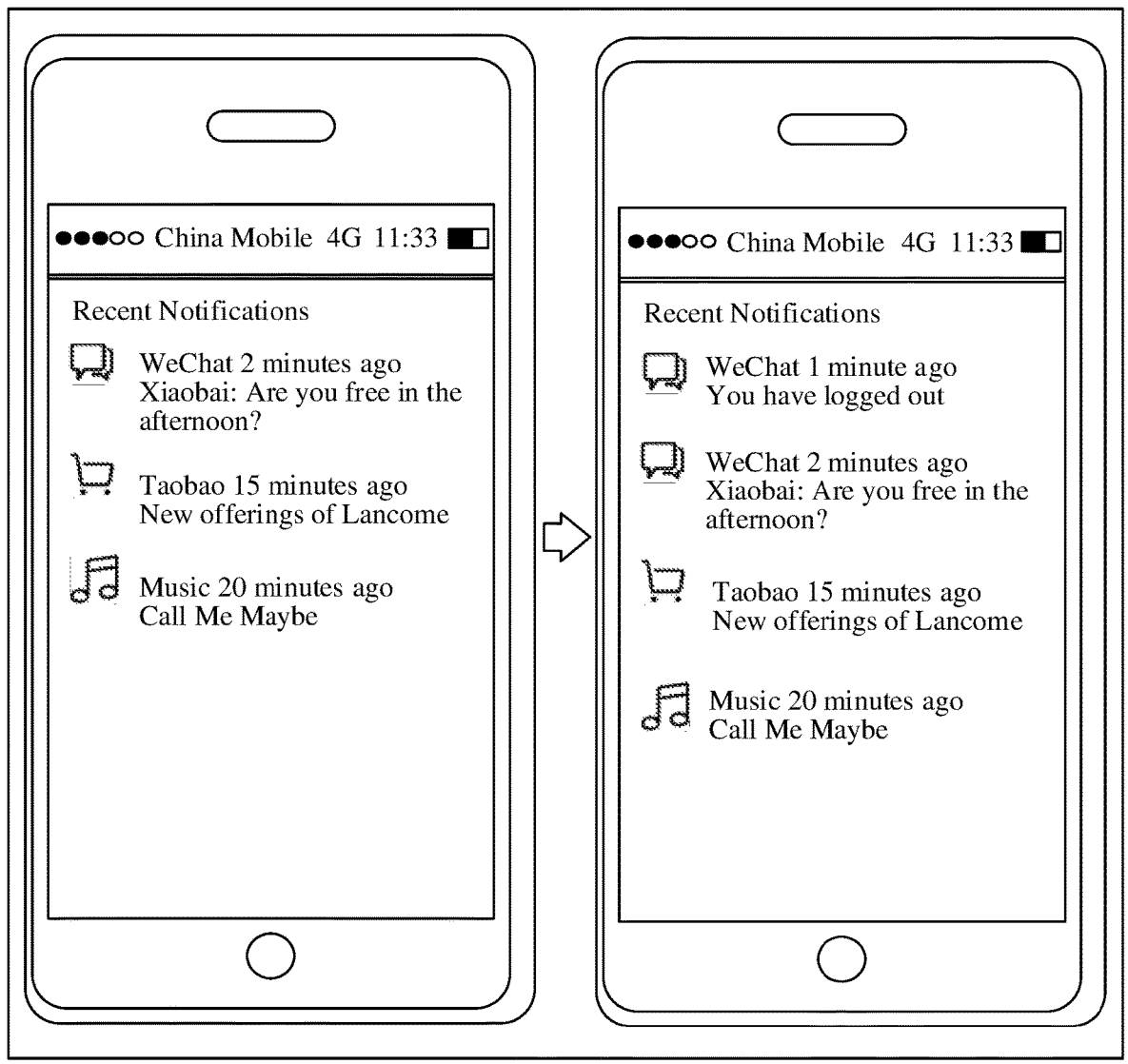
FIG. 4 is another schematic diagram of a current notification message processing method of a mobile terminal.

A scenario in the embodiments of this application is shown in FIG. 2. Both a first terminal and a second terminal are connected to an application server corresponding to each application installed on the terminals via a push server. When the application server corresponding to each application needs to push a notification message to the terminal, the application server corresponding to each application first sends the notification message to the push server, and then the push server pushes the notification message to the corresponding terminal and application based on an attribute parameter of the notification message. Currently, a notification message push process is generally shown in FIG. 3 and FIG. 4. As shown in FIG. 3, if a user does not view a notification message of WeChat for a long time, a notification bar interface keeps retaining all notification messages of the WeChat application. When a WeChat account of the user is logged out, after receiving a notification message used to indicate that the user account is logged out, the notification bar interface still retains the previously received notification messages. As shown in FIG. 4, the notification bar interface includes notification messages of a plurality of applications, for example, a notification message of Taobao, a notification message of music, and a notification message of WeChat. When a user account of one of the applications is logged out, after receiving a notification message used to indicate that the user account of the application is logged out, the notification bar interface still retains the previously received notification message of each application.

It may be understood that when the WeChat account of the user is logged out, the application server corresponding to WeChat may not send a notification message used to indicate that the user account is logged out, but does not send another notification message. In this case, an unread notification message corresponding to the WeChat account of the user on the notification bar interface of the mobile phone is still retained.

To resolve a defect in the prior art, a solution in the embodiments of this application is proposed. The following describes a notification message processing method according to the embodiments of this application.

Figure 5:
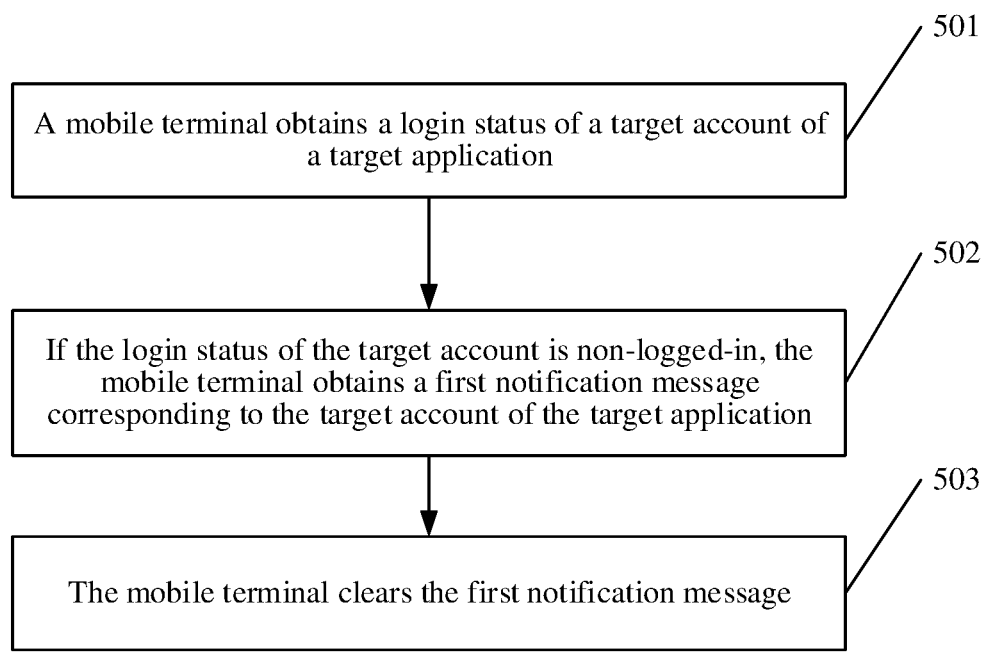
FIG. 5 is a schematic diagram of an embodiment of a notification message processing method according to an embodiment of this application.

Specifically, referring to FIG. 5, a notification message processing method according to an embodiment of this application specifically includes the following steps.

In this embodiment of this application, a notification message is a message, of an application program, that can be displayed to a user outside a conventional user interface (user interface, UI) of the application program, for example, in a notification bar, a lock screen interface, or a floating window. Generally, the notification message is displayed when the user does not read the notification message. If the user reads the notification message in the application program, the notification message is no longer displayed.

Attribute parameters of the notification message include information such as an identity of the notification message, an identity of an application to which the notification message belongs, notification content of the notification message, and a notification channel ID of the notification message. In addition, when a mobile terminal supports a notification channel group, the notification channel ID of the notification message belongs to a specific notification channel group ID. The identity of the notification message is used to distinguish and identify the notification message. The identity of the notification message may be distinguished in a plurality of manners, for example, by using a special digital code or a special field. Specifically, in a WeChat application, a user account "scting0120" corresponds to five notification messages, and identities of the five notification messages may be respectively 1, 2, 3, 4, and 5 in chronological order. The notification content of the notification message includes a sender name of the notification message, message content sent by the sender, a sending time, an application program name corresponding to the notification message, and the like. The notification channel is used to indicate a feature of a notification message of an account of an application program. For example, a notification channel of an account "scting0120" in the WeChat application may include displaying a notification message on a lock screen, importance of a notification message, and using a sound as an alert tone. The notification channel group includes a group of related notification channels, for example, all notification channels that belong to an account of an application program.

That the application program is running means that a process of the application program is running in an operating system of the mobile terminal. That the application program is not running means that a process of the application program is not running in the operating system of the mobile terminal.

That the mobile terminal is in a network connected state means that the mobile terminal is connected to an application server or a push server via a network, that is, data exchange can be performed.

That the mobile terminal is in a network disconnected state means that the mobile terminal is not connected to an application server or a push server via a network, that is, data exchange cannot be performed.

501. The mobile terminal obtains a login status of a target account of a target application.

The mobile terminal checks, in a use process, a login status of an account corresponding to each application installed on the mobile terminal.

In this embodiment, the mobile terminal may check, by using the following several possible implementations, the login status of the account corresponding to each application installed on the mobile terminal:

In a possible implementation, the mobile terminal receives a notification message that is used to indicate that the target account of the target application is logged out and that is sent by a push server. For example, if the user logs in to the WeChat application using a WeChat account A of the user on a new mobile phone after a mobile phone of the user is lost, the lost mobile phone receives a notification message "Your account is logged in on another device". In this case, the lost mobile phone performs semantic analysis on the notification message "Your account is logged in on another device", and may learn, through the semantic analysis, that the login status of the WeChat account A on the lost mobile phone is non-logged-in.

In another possible implementation, the mobile terminal detects, in an operating system of the mobile terminal, that the target account of the target application is in a non-logged-in state. For example, the mobile phone determines that the WeChat account of the user is non-logged-in by checking the login status of the WeChat account of the user in an operating system.

In another possible implementation, the mobile terminal receives instruction information used to indicate that the target account of the target application is logged out. For example, when the WeChat application is in a running state, if the user selects to directly log out of the WeChat account of the user on the mobile phone, the mobile phone may receive instruction information that is used to indicate that the WeChat account is logged out and that is sent by a service server corresponding to the WeChat application.

Optionally, the instruction information may also be provided by the mobile terminal. That is, when the WeChat application is in the running state, if the user directly logs out of the WeChat account of the user on the mobile phone, the mobile phone may directly locally obtain instruction information used to indicate that the WeChat account is logged out.

502. If the login status of the target account is non-logged-in, the mobile terminal obtains a first notification message corresponding to the target account of the target application.

If the mobile terminal determines that the login status of the target account is non-logged-in, the mobile terminal obtains the first notification message corresponding to the target account of the target application.

Optionally, the mobile terminal may obtain, by using a getActiveNotification( ) method, the notification message corresponding to the target account of the target application. Specific operations are as follows:

If the mobile terminal does not support a notification channel group function, the mobile terminal obtains, by using the getActiveNotification( ) method, a displayed notification message of the target application installed on the mobile terminal. Then, the mobile terminal obtains, by using a getId( ) method for each notification message, an identity ID of each notification message. The mobile terminal obtains, by using getPackageName( ) for each notification message, an identity of an application to which each notification message belongs. The mobile terminal obtains notification content of each notification message based on getNotification( ). The mobile terminal uses each notification message as the first notification message corresponding to the target application.

If the mobile terminal does not support a notification channel group function, the mobile terminal obtains, by using the getActiveNotification( ) method, a displayed notification message of the target application installed on the mobile terminal. Then, the mobile terminal obtains, by using a getId( ) method for each notification message, an identity ID of each notification message. The mobile terminal obtains, by using getPackageName( ) for each notification message, an identity of an application to which each notification message belongs. The mobile terminal obtains notification content of each notification message based on getNotification( ). The mobile terminal obtains, by using getChannelID( ), a notification channel ID to which each notification message belongs, and obtains, by using getGroup( ), a notification channel group ID to which each notification channel belongs. Because the target account of the target application is in a one-to-one correspondence with a notification channel group ID of a notification message, each notification message of the mobile terminal is the first notification message corresponding to the target account of the target application.

In this embodiment, the non-logged-in state of the target account includes: a logout state of the target account switched from a logged-in state and a status indicating that the target account is never logged in or is not logged in for a long time.

503. The mobile terminal clears the first notification message.

The mobile terminal invokes a clearing module to clear the first notification message corresponding to the target account.

Optionally, when clearing the notification message corresponding to the target account, the mobile terminal may invoke a cancel( ) method by using notification management, to clear a notification message corresponding to a specified identity ID, or invoke a cancelAll( ) method to clear all displayed notification messages of the target account.

For example, when clearing a notification message corresponding to a WeChat account "scting0120", the mobile terminal may first obtain all five notification messages corresponding to the WeChat account "scting0120", and then uniformly clear the five notification messages. The mobile terminal may also clear a notification message whose identity is 1 as long as the notification message whose specified identity is 1 is obtained. Then, the mobile terminal clears a notification message whose identity is 2 as long as the notification message whose specified identity is 2 is obtained. This operation is repeated until all the notification messages corresponding to the WeChat account "scting0120" are cleared. Then, a clearing operation is stopped.

Optionally, the mobile terminal may further screen all the notification messages corresponding to the target account. Specific implementations are as follows:

In a possible implementation, the mobile terminal determines whether importance of the notification message is higher than preset importance. If yes, the mobile terminal clears the notification message. If no, the mobile terminal displays the notification message on a notification bar interface.

In this embodiment, the importance of the notification message may be determined based on the notification content of the notification message. If user privacy related to the notification content of the notification message is more important, the importance is higher. For example, if the notification content of the notification message relates to financial information such as a bank card, Alipay, and WeChat payment of the user, the importance is the highest. If the notification content of the notification message relates to information such as contact information and a home address of the user, the importance is second highest. If the notification message relates to messages such as an official account information recommendation, a version update prompt, or an account logout prompt, the importance is low.

In another possible implementation, the mobile terminal determines whether the content carried in the notification message meets preset content. If yes, the mobile terminal displays the notification message. If no, the mobile terminal clears the notification message.

In this embodiment, a notification message whose notification content is content such as the official account information recommendation, the version update prompt, the account logout prompt, or another functional content recommendation may be displayed, and a notification message that does not include the content is not displayed.

In this embodiment, when clearing the notification message, the mobile terminal may not display the notification message on a notification bar interface and does not delete internal storage of the notification message, or may not display the notification message on a notification bar interface and delete internal storage of the notification message. A specific manner is not limited herein.

In this embodiment, when the target account of the target application is in a non-logged-in state, the mobile terminal clears the notification message corresponding to the target account, to effectively ensure that user privacy is not disclosed.

The following describes possible implementations in the embodiments of this application by using a specific application scenario.

Figure 6:
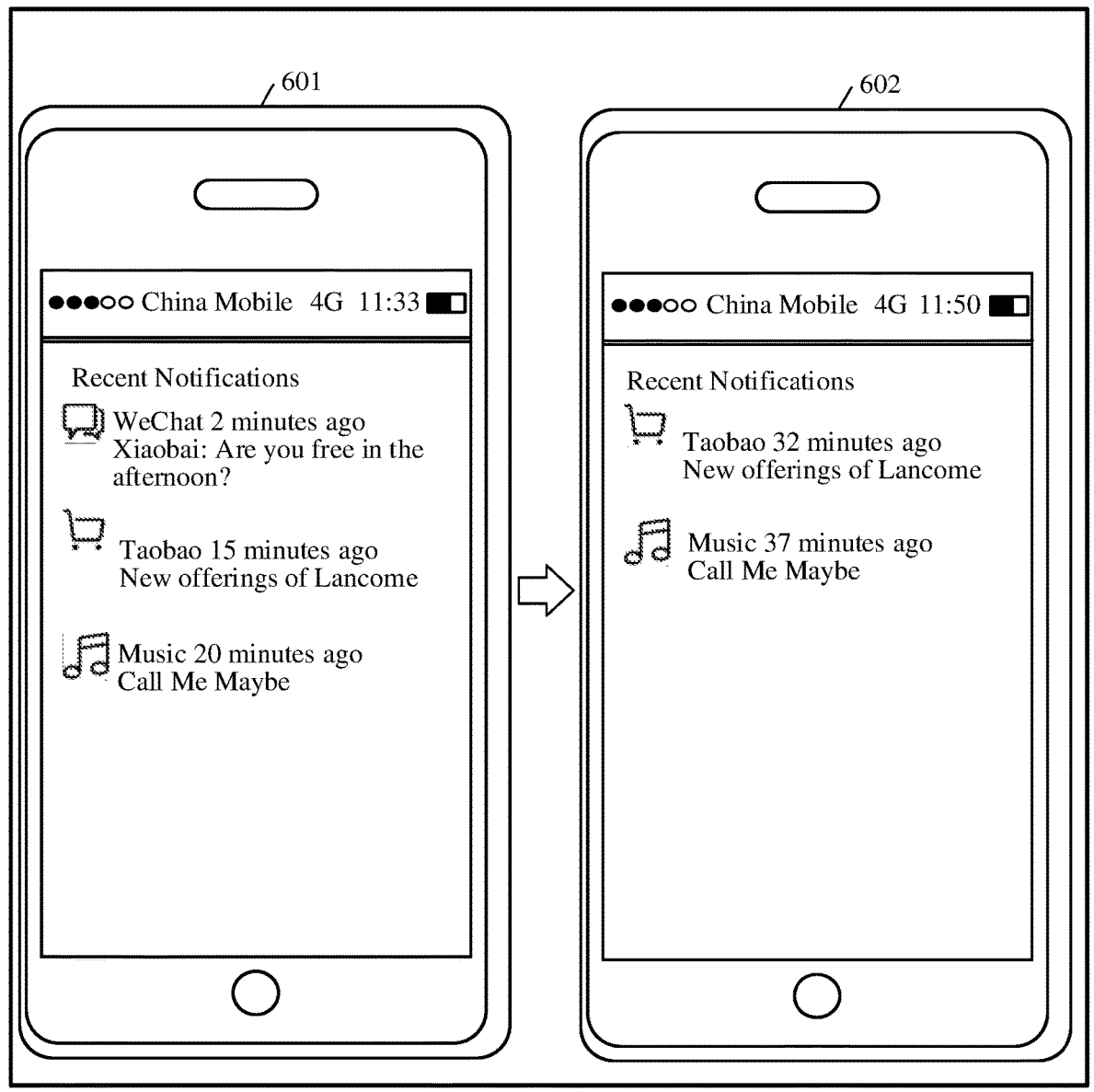
FIG. 6 is a schematic diagram of an interface of a notification message processing method according to an embodiment of this application.

Specifically, FIG. 6 is a user interface diagram of a possible implementation of a notification message processing method according to an embodiment of this application.

In this embodiment, a mobile phone A of a user is in a network connected state, and the mobile phone A displays unread notification messages on a notification bar interface. The notification messages include notification messages of a plurality of applications installed on the mobile phone A. For example, as shown in an interface 601 in FIG. 6, the notification messages include: an unread chat record with a friend in WeChat, for example, "Xiaobai: Are you free in the afternoon?"; an unread message pushed by Taobao to the user based on the user's preference, for example, "New offerings of Lancome"; and a song name pushed by music software, for example, "Call Me Maybe".

If the mobile phone A is lost and the WeChat application in the mobile phone A is running, when the user logs in to a WeChat account of the user on a new mobile phone B, a push server sends, to the mobile phone A, a notification message indicating that the user account of the WeChat application is logged out. If the mobile phone A learns, based on the notification message, that the WeChat account of the user is logged out, the mobile phone A invokes a clearing module of the mobile phone A to clear the notification message corresponding to the WeChat account of the user. Finally, as shown in an interface 602, the notification message of the WeChat account is not displayed in the notification bar interface, and only the unread message pushed by Taobao to the user, for example, "New offerings of Lancome" and the song name pushed by the music software, for example, "Call Me Maybe" are displayed.

Optionally, the notification message indicating that the user account of the WeChat application is logged out may not be displayed on the notification bar interface of the mobile phone A, or may be displayed as "Your account is logged in on another device". A specific case is not limited herein. In this embodiment, an example in which the notification message indicating that the user account of the WeChat application is logged out is not displayed on the notification bar interface of the mobile phone A is used for description.

Figure 7:
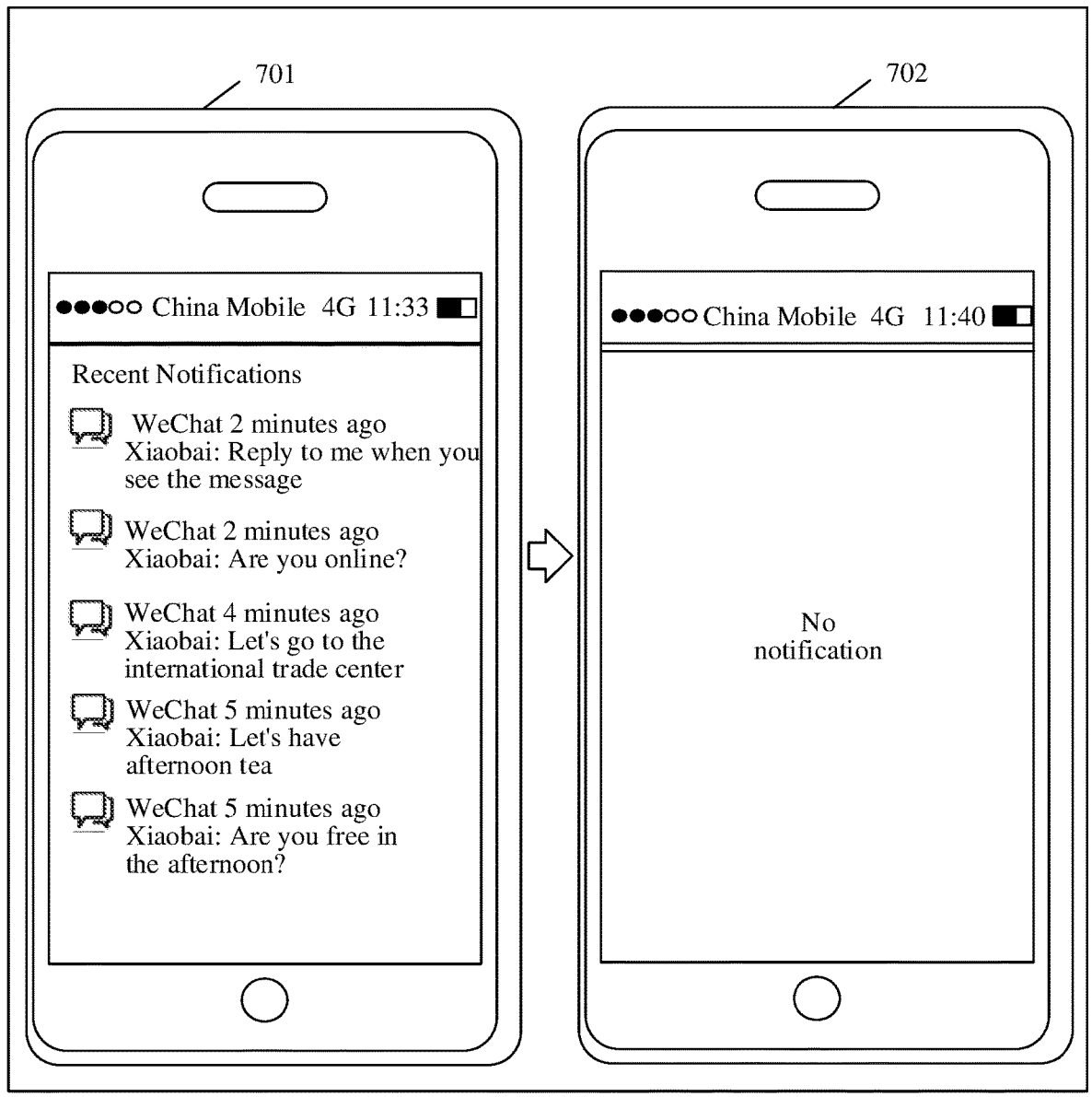
FIG. 7 is a schematic diagram of another interface of a notification message processing method according to an embodiment of this application.

Specifically, FIG. 7 is a user interface diagram of another possible implementation of a notification message processing method according to an embodiment of this application.

In this embodiment, a mobile phone A of a user is in a network connected state, and the mobile phone A displays an unread notification message on a notification bar interface. The notification message is a notification message of a WeChat account of the user on the notification bar interface of the mobile phone A. For example, as shown in an interface 701 in FIG. 7, an unread chat record between the user and a friend in a WeChat application is shown in FIG. 7. If the mobile phone A is lost and the WeChat application in the mobile phone A is running, when the user logs in to a WeChat account of the user on a new mobile phone B, a push server sends, to the mobile phone A, a notification message indicating that the user account of the WeChat application is logged out. If the mobile phone A learns, based on the notification message, that the WeChat account of the user is logged out, the mobile phone A invokes a clearing module of the mobile phone A to clear the notification message corresponding to the WeChat account of the user. Finally, as shown in an interface 702, "No notification" is displayed on the notification bar interface.

Figure 8:
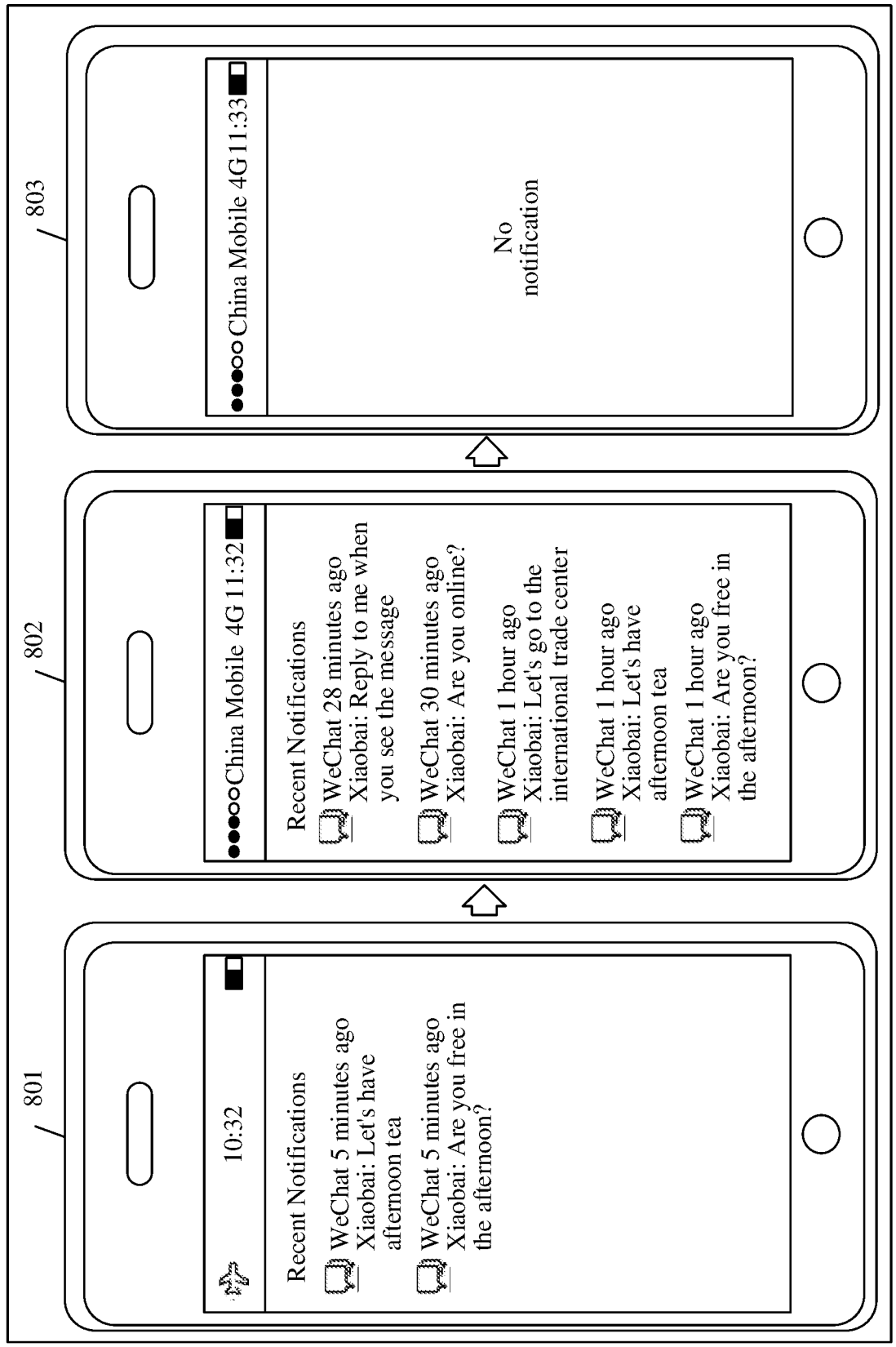
FIG. 8 is a schematic diagram of another interface of a notification message processing method according to an embodiment of this application.

Specifically, FIG. 8 is a user interface diagram of another possible implementation of a notification message processing method according to an embodiment of this application.

In this embodiment, a mobile phone A of a user is first in a network disconnected state, and then reconnects to a network and is in a network connected state. In an interface 801 shown in FIG. 8, an unread notification message of a WeChat account of the user is displayed on a notification bar interface of the mobile phone A of the user when the mobile phone A is in the network disconnected state. When the mobile phone A of the user is disconnected from the network, a friend "Xiaobai" of the user still sends a WeChat message to the user. In addition, the WeChat account is logged out of the mobile phone A due to reasons such as login on another mobile phone during a network disconnection period. During the network disconnection period of the mobile phone A, after receiving the WeChat message sent by "Xiaobai" to the user, a push server caches the WeChat message in the push server. After the mobile phone A is connected to the network, the push server sends, to the mobile phone A, the cached WeChat message sent by "Xiaobai" to the user. Because the mobile phone A detects that the WeChat application is not running, the mobile phone A performs semantic analysis on each received notification message, and determines, based on the semantic analysis, whether the WeChat application of the mobile phone A is logged out. For example, when receiving a notification message "Xiaobai: Let's go to the international trade center", if a login status of the WeChat application cannot be determined based on the semantic analysis, the mobile phone A invokes an interface to display the notification message "Xiaobai: Let's go to the international trade center". As shown in an interface 802, the mobile phone A invokes an interface to display two messages "Xiaobai: Are you online?" and "Xiaobai: Rely to me when you see the message" on the notification bar interface of the mobile phone A. When receiving the notification message indicating that the WeChat account of the user is logged out, the mobile phone A learns, through semantic analysis, that the WeChat account of the user is logged out, and then invokes a clearing module of the mobile phone A to clear the notification messages corresponding to the WeChat account of the user. Finally, as shown in an interface 803, "No notification" is displayed in the notification bar interface.

Figure 9:
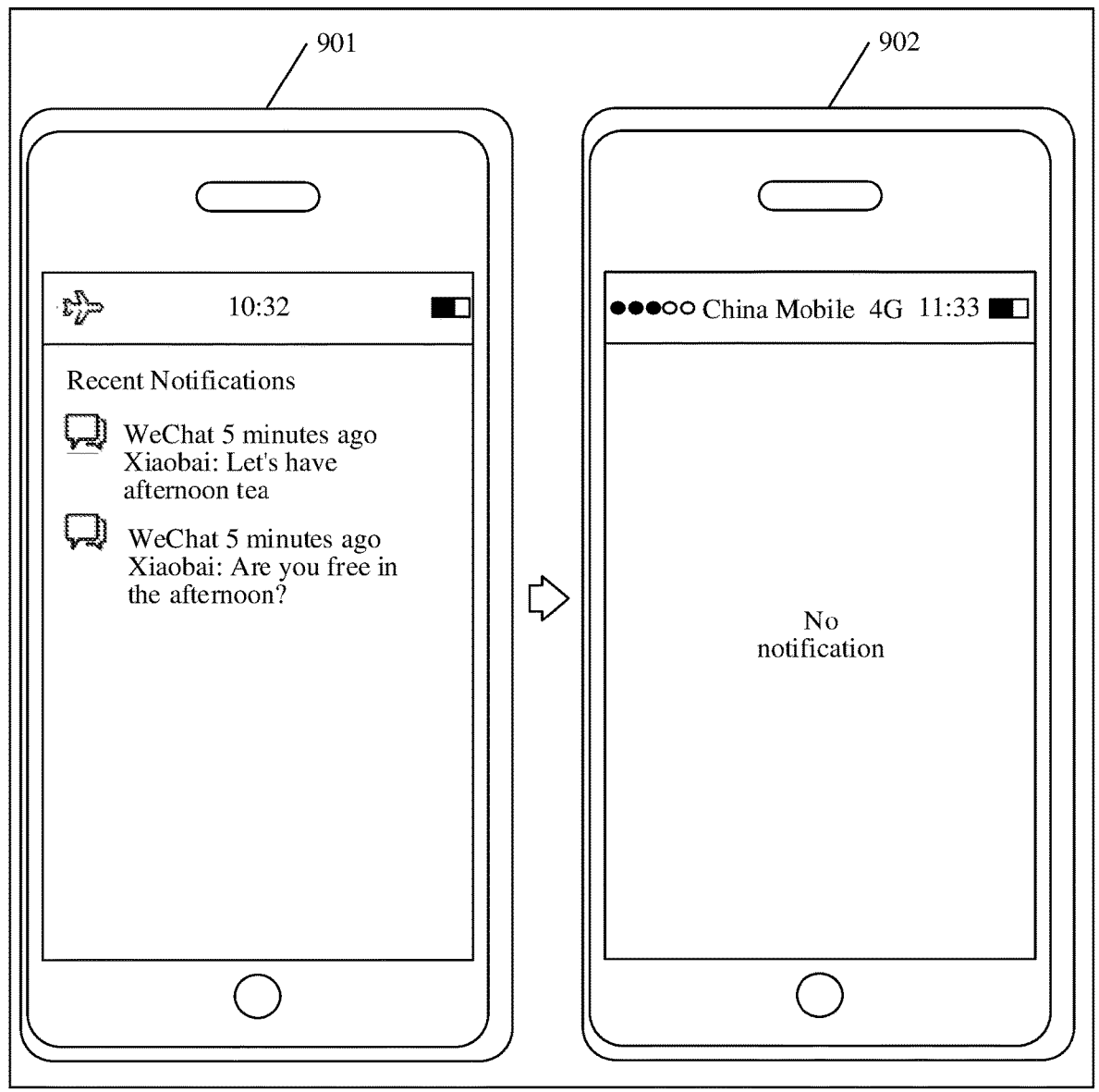
FIG. 9 is a schematic diagram of another interface of a notification message processing method according to an embodiment of this application.

Specifically, FIG. 9 is a user interface diagram of another possible implementation of a notification message processing method according to an embodiment of this application.

In this embodiment, a mobile phone A of a user is first in a network disconnected state, and then reconnects to a network and is in a network connected state. In an interface 901 shown in FIG. 9, an unread notification message of a WeChat account of the user is displayed on a notification bar interface of the mobile phone A of the user when the mobile phone A is in the network disconnected state. When the mobile phone A of the user is disconnected from the network, a friend "Xiaobai" of the user still sends a WeChat message to the user. In addition, the WeChat account is logged out of the mobile phone A due to reasons such as login on another mobile phone during a network disconnection period. During the network disconnection period of the mobile phone A, after receiving the WeChat message sent by "Xiaobai" to the user, a push server caches the WeChat message in the push server. After the mobile phone A is connected to the network, the push server sends, to the mobile phone A, the cached WeChat message sent by "Xiaobai" to the user. Because the mobile phone A detects that the WeChat application is running, the mobile phone A checks, by using a system, whether the WeChat application of the mobile phone A is logged out. If it is determined that the WeChat account of the user is logged out, a WeChat message sent by the friend "Xiaobai" of the user during the network disconnection of the mobile phone A is directly discarded and is not displayed. In addition, the mobile phone A invokes a clearing module to clear notification messages corresponding to the WeChat account of the user: "Are you free in the afternoon?" and "Xiaobai: Let's have afternoon tea". Finally, as shown in an interface 902, "No notification" is displayed on the notification bar interface.

Figure 10:
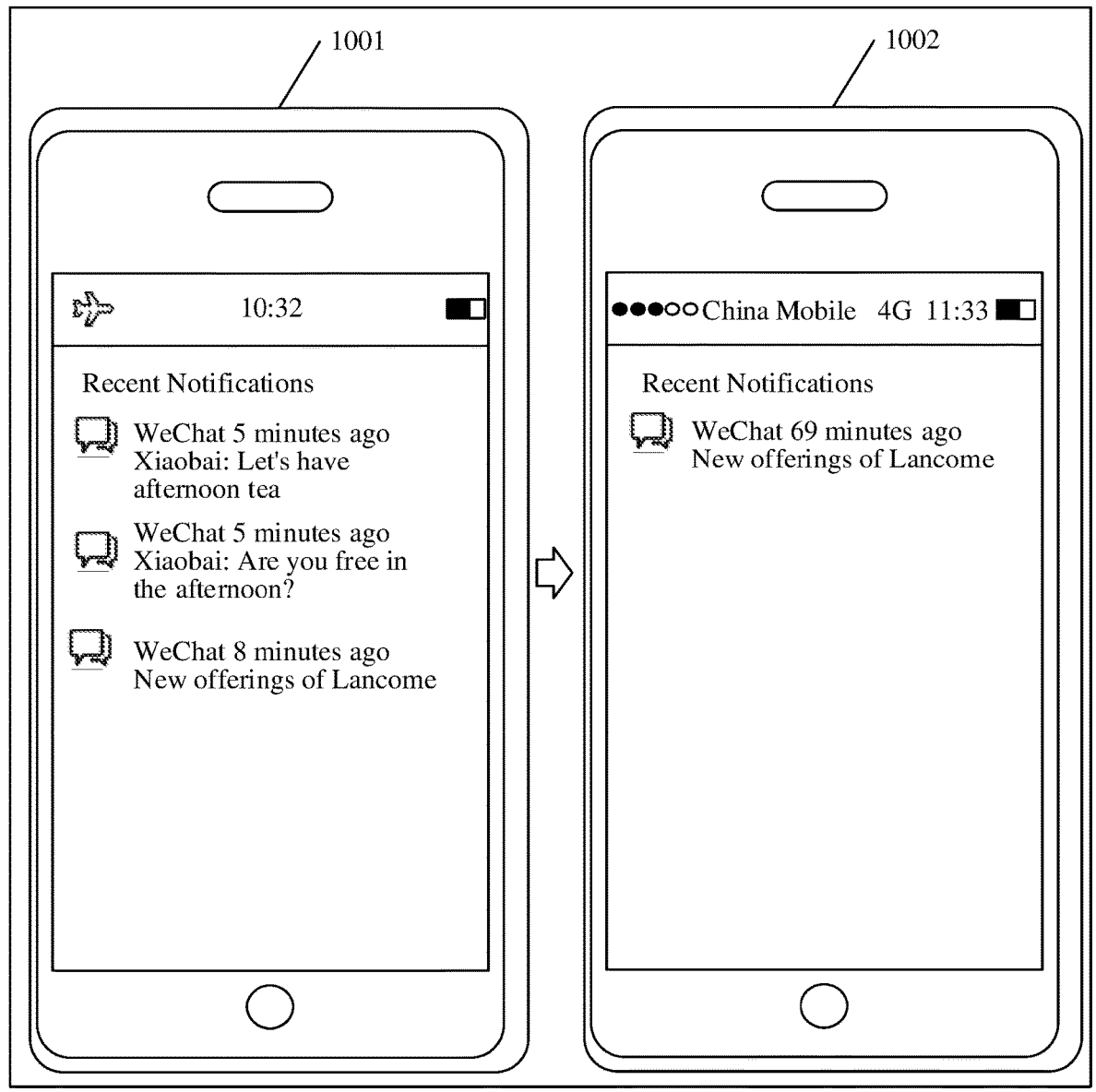
FIG. 10 is a schematic diagram of another interface of a notification message processing method according to an embodiment of this application.

Specifically, FIG. 10 is a user interface diagram of another possible implementation of a notification message processing method according to an embodiment of this application.

In this embodiment, a mobile phone A of a user is first in a network disconnected state, and then reconnects to a network and is in a network connected state. In an interface 1001 shown in FIG. 10, an unread notification message of a WeChat account of the user is displayed on a notification bar interface of the mobile phone A of the user before the mobile phone A is in the network disconnected state. When the mobile phone A of the user is disconnected from the network, a friend "Xiaobai" of the user still sends a WeChat message to the user. In addition, the WeChat account is logged out of the mobile phone A due to reasons such as login on another mobile phone during a network disconnection period. During the network disconnection period of the mobile phone A, after receiving the WeChat message sent by "Xiaobai" to the user, a push server caches the WeChat message in the push server. After the mobile phone A is connected to the network, the push server sends, to the mobile phone A, the cached WeChat message sent by "Xiaobai" to the user. Because the mobile phone A detects that the WeChat application is running, the mobile phone A checks, by using a system, whether the WeChat application of the mobile phone A is logged out. If the mobile phone A determines that the WeChat account of the user is logged out, the mobile phone A determines importance or content of a notification message corresponding to the WeChat account, and clears a notification message whose importance is higher than preset importance or whose content does not meet preset content.

In this embodiment, the importance of the notification message may be determined by the mobile terminal based on the notification content of the notification message. If user privacy related to the notification content of the notification message is more important, the importance is higher. For example, if the notification content of the notification message relates to financial information such as a bank card, Alipay, and WeChat payment of the user, the importance is the highest. If the notification content of the notification message relates to information such as contact information and a home address of the user, the importance is second highest. If the notification message relates to messages such as an official account information recommendation, a version update prompt, or an account logout prompt, the importance is low. The importance may be preset based on an actual requirement.

In this embodiment, a notification message whose notification content is content such as the official account information recommendation, the version update prompt, the account logout prompt, or another functional content recommendation may be displayed by the mobile terminal, and a notification message that does not include such content is not displayed. In this embodiment, the mobile phone A determines importance or content of received notification messages, such as "Xiaobai: Let's go to the international trade center", "Xiaobai: Are you online?", "Xiaobai: Reply to me when you see the message", "Account is logged out" and notification messages displayed on the mobile phone A, such as "Xiaobai: Are you free in the afternoon?", "Xiaobai: Let's have afternoon tea", and "New offerings of Lancome". The mobile phone A determines to: clear notification messages such as "Xiaobai: Let's go to the international trade center", "Xiaobai: Are you online?", "Xiaobai: Reply to me when you see the message", "Xiaobai: Are you free in the afternoon?", and "Xiaobai: Let's have afternoon tea"; and retain notification messages such as "New offerings of Lancome" and "Account is logged out". Finally, as shown in an interface 1002, the notification bar interface displays the notification messages "New offerings of Lancome" and "Account is logged out".

Figure 11:
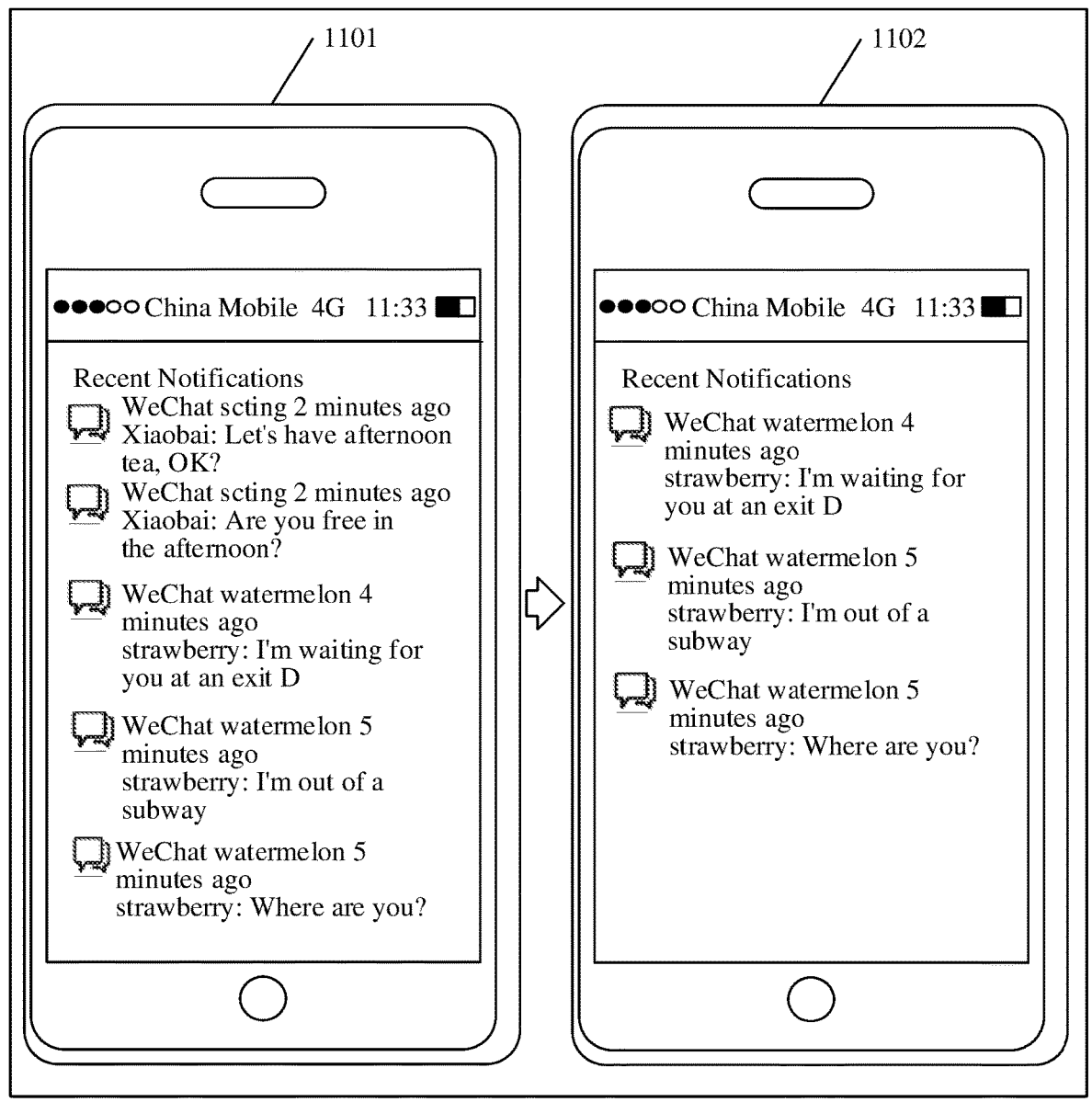
FIG. 11 is a schematic diagram of another interface of a notification message processing method according to an embodiment of this application.

Specifically, FIG. 11 is a user interface diagram of another possible implementation of a notification message processing method according to an embodiment of this application. A mobile terminal in this embodiment supports a notification channel group function. A specific case may be that two accounts, for example, accounts "scting" and "watermelon", may be simultaneously logged in to a WeChat application of a mobile phone A.

In this embodiment, the mobile phone A of a user is in a network connected state, and the mobile phone A displays unread notification messages on a notification bar interface. The notification messages include notification messages of the two accounts of the WeChat application installed on the mobile phone A. For example, as shown in an interface 1101 in FIG. 11, the WeChat application includes two accounts: "scting" and "watermelon". In the interface 1101, a chat record between a friend "Xiaobai" and "scting" is displayed under the account "scting", and the record is specifically as follows: "Xiaobai: Are you free in the afternoon?", and "Xiaobai: Let's have afternoon tea, OK?". A chat record between a friend "strawberry" and "watermelon" is displayed under the account "watermelon", and the chat record is as follows: "strawberry: Where are you?", "strawberry: I'm out of a subway", and "strawberry: I'm waiting for you at an exit D". If the mobile phone A is lost and the WeChat application in the mobile phone A is running, when the user logs in to the account "scting" on a new mobile phone B, a push server sends, to the mobile phone A, a notification message indicating that the user account "scting" of the WeChat application is logged out. In this case, if learning, based on the notification message indicating that the user account "scting" of the WeChat application is logged out, that the WeChat account "scting" of the user is logged out, the mobile phone A invokes a clearing module of the mobile phone A to clear the notification messages corresponding to the WeChat account "scting" of the user. As shown in an interface 1102, only unread push messages corresponding to the account "watermelon" are left on the notification bar interface, for example, "strawberry: Where are you?", "strawberry: I am out of a subway", and "strawberry: I am waiting for you at an exit D".

The foregoing describes the notification message processing method in the embodiments of this application. The following describes a mobile terminal in an embodiment of this application.

Figure 12:
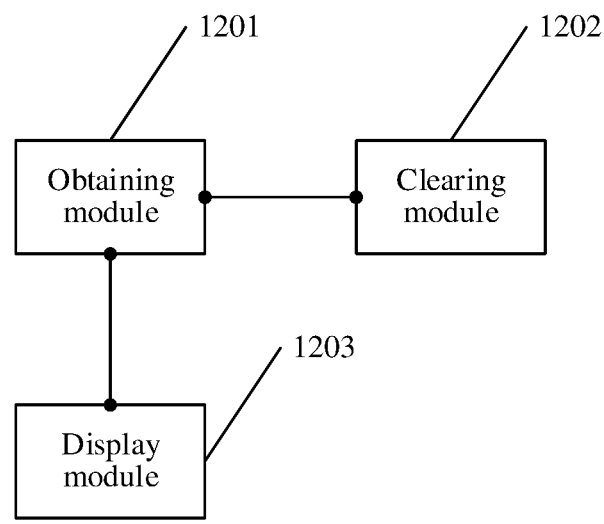
FIG. 12 is a schematic diagram of an embodiment of a mobile terminal according to an embodiment of this application.

Specifically, referring to FIG. 12, an embodiment of a mobile terminal according to an embodiment of this application includes:

an obtaining module 1201, configured to obtain a login status of a target account of a target application, where the obtaining module 1201 is further configured to: if the login status of the target account is non-logged-in, obtain a first notification message corresponding to the target account of the target application; and a clearing module 1202, configured to clear the first notification message.

Optionally, the obtaining module 1201 is further configured to obtain a notification channel group identity ID of the target application, where the notification channel group ID is used to indicate the target account of the target application.

Optionally, the obtaining module 1201 is specifically configured to: receive a second notification message, where the second notification message is sent by a push server to the mobile terminal; and determine, based on the second notification message, that the login status of the target account of the target application is non-logged-in.

Optionally, based on the second notification message, the obtaining module 1201 may obtain an analysis result by performing semantic analysis on notification content of the second notification message, and then determine, based on the analysis result, that the login status of the target account of the target application is non-logged-in.

Optionally, the obtaining module 1201 is specifically configured to detect, in an operating system of the mobile terminal, that the login status of the target account of the target application is non-logged-in.

Optionally, the obtaining module 1201 is specifically configured to receive instruction information, where the instruction information indicates that the login status of the target account of the target application is non-logged-in, and the instruction information is sent by an application server of the target application to the mobile terminal or is provided by the mobile terminal.

Optionally, the clearing module 1202 is further configured to: if importance of the notification message is higher than preset importance, trigger an action of clearing the notification message.

The mobile terminal further includes a display module 1203, where the display module 1203 displays the notification message if the importance of the notification message is lower than or equal to the preset importance.

Optionally, the clearing module 1202 is further configured to: if the importance of the notification message is higher than or equal to the preset importance, trigger the action of clearing the notification message.

The display module 1203 is further configured to display the notification message if the importance of the notification message is lower than the preset importance.

Optionally, the clearing module 1202 is further configured to: if content of the notification message does not include preset information, trigger an action of clearing the notification message, where the preset information includes information used to indicate that the account is not logged in and information used to indicate an application program version update.

The display module 1203 is further configured to display the notification message if the content of the notification message includes the preset information.

Optionally, the clearing module 1202 is specifically configured to skip displaying the notification message and delete the notification message;

or skip displaying the notification message and retain the notification message.

In this embodiment, when the target account of the target application is in a non-logged-in state, the mobile terminal clears the notification message corresponding to the target account, to effectively ensure that user privacy is not disclosed.

Optionally, in this embodiment, the obtaining module 1201, the clearing module 1202, and the display module 1203 are further configured to perform related steps in the foregoing method embodiments.

Figure 13:
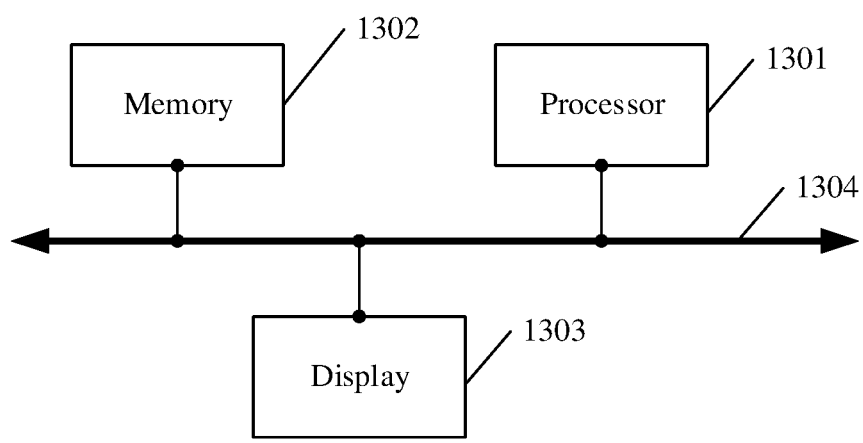
FIG. 13 is a schematic diagram of another embodiment of a mobile terminal according to an embodiment of this application.

Specifically, referring to FIG. 13, another embodiment of a mobile terminal according to an embodiment of this application includes:

one or more processors 1301, a memory 1302 and a display 1303.

The mobile terminal further includes a bus 1304.

The processor 1301, the memory 1302, and the display 1303 are connected to each other by using the bus 1304.

The bus 1304 may be a peripheral component interconnect (peripheral component interconnect, PCI for short) bus, an extended industry standard architecture (extended industry standard architecture, EISA for short) bus, and the like. The bus may be classified into an address bus, a data bus, a control bus, and the like. For ease of representation, only one thick line is used to represent the bus in FIG. 13, but this does not mean that there is only one bus or only one type of bus.

The processor 1301 may be a central processing unit (central processing unit, CPU for short), a network processor (network processor, NP for short), or a combination of a CPU and an NP.

The processor 1301 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field programmable gate array (field-programmable gate array, FPGA for short), a generic array logic (generic array logic, GAL for short), or any combination thereof.

The memory 1302 may include a volatile memory (volatile memory), for example, a random access memory (random access memory, RAM for short). Alternatively, the memory may include a non-volatile memory (non-volatile memory), for example, a flash memory (flash memory), a hard disk drive (hard disk drive, HDD for short), or a solid-state drive (solid-state drive, SSD for short). Alternatively, the memory 1302 may include a combination of the foregoing types of memories.

Optionally, the memory 1302 is configured to store a program instruction. By invoking the program instruction stored in the memory 1302, the processor 1301 can perform one or more steps or an optional implementation in the embodiments shown in FIG. 5 to FIG. 11, to implement a function of the mobile terminal in the foregoing methods.

Specifically, the processor 1301 performs the following steps:
obtaining a login status of a target account of a target application;
if the login status of the target account is non-logged-in, obtaining a first notification message corresponding to the target account of the target application; and clearing the first notification message.

Optionally, the processor 1301 is further configured to obtain a notification channel group identity ID of the target application, where the notification channel group ID is used to indicate the target account of the target application.

Optionally, the processor 1301 is specifically configured to receive a second notification message, where the second notification message is sent by a push server to the mobile terminal; and determine, based on the second notification message, that the login status of the target account of the target application is non-logged-in.

Optionally, based on the second notification message, the processor 1301 may obtain an analysis result by performing semantic analysis on notification content of the second notification message, and then determine, based on the analysis result, that the login status of the target account of the target application is non-logged-in.

Optionally, the processor 1301 is specifically configured to detect, in an operating system of the mobile terminal, that the login status of the target account of the target application is non-logged-in.

Optionally, the processor 1301 is specifically configured to receive instruction information, where the instruction information indicates that the login status of the target account of the target application is non-logged-in, and the instruction information is sent by an application server of the target application to the mobile terminal or is provided by the mobile terminal.

Optionally, the processor 1301 is further configured to: if importance of the notification message is higher than preset importance, trigger an action of clearing the notification message.

The mobile terminal further includes a display 1303, where the display 1303 displays the notification message if the importance of the notification message is lower than or equal to the preset importance.

Optionally, the processor 1301 is further configured to: if the importance of the notification message is higher than or equal to the preset importance, trigger the action of clearing the notification message.

The display 1303 is further configured to display the notification message if the importance of the notification message is lower than the preset importance.

Optionally, the processor 1301 is further configured to: if content of the notification message does not include preset information, trigger an action of clearing the notification message, where the preset information includes information used to indicate that the account is not logged in and information used to indicate an application program version update.

The display 1303 is further configured to display the notification message if the content of the notification message includes the preset information.

Optionally, the processor 1301 is specifically configured to delete the notification message when the display 1303 does not display the notification message;
or
retain the notification message by using the memory 1301 when the display 1303 does not display the notification message.

In this embodiment, when the target account of the target application is in a non-logged-in state, the mobile terminal clears the notification message corresponding to the target account, to effectively ensure that user privacy is not disclosed.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

As described above, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
    receiving, by a first mobile terminal when an account of a first application is logged in to on the first mobile terminal, a first notification corresponding to the first application;
    displaying, by the first mobile terminal, the first notification;
    determining, by the first mobile terminal, whether the account of the first application has been logged in to on a second mobile terminal, wherein the second mobile terminal is different from the first mobile terminal; and
    automatically in response to determining the account of the first application has been logged in to on the second mobile terminal, deleting the displayed first notification from the first mobile terminal.

2. The method according to claim 1, further comprising:
    obtaining a user ID of the first application, wherein the user ID indicates the account of the first application.

3. The method according to claim 1, wherein determining, by the first mobile terminal, whether the account of the first application has been logged in to on the second mobile terminal comprises:
    determining whether the account of the first application has been logged in to on the second mobile terminal by analyzing content of a second notification received from a server.

4. The method according to claim 1, wherein determining, by the first mobile terminal, whether the account of the first application has been logged in to on the second mobile terminal comprises:
    determining the account of the first application has been logged in to on the second mobile terminal in response to receiving a logged out instruction from a server.

5. The method according to claim 1, wherein an importance of the first notification is higher than a preset threshold.

6. The method according to claim 5, further comprising:
    receiving, by the first mobile terminal when the account of the first application is logged in to on the first mobile terminal, a third notification corresponding to the first application; and
    retaining the third notification on the first mobile terminal when an importance of the third notification is lower than or equal to the preset threshold.

7. A mobile terminal, comprising:
    a non-transitory memory storing instructions; and
    a processor coupled to the non-transitory memory and configured to execute the instructions to:
        receive a first notification corresponding to a first application when an account of the first application is logged in to on the mobile terminal;
        display the first notification;
        determine whether the account of the first application has been logged in to on another mobile terminal; and
        automatically in response to determining the account of the first application has been logged in to on the another terminal, deleting the displayed first notification from the mobile terminal.

8. The mobile terminal according to claim 7, wherein the processor is further configured to execute the instructions to:
    obtain a user ID of the first application, wherein the user ID indicating the account of the first application.

9. The mobile terminal according to claim 7, wherein determining whether the account of the first application has been logged in to on the another mobile terminal comprises:
    determining whether the account of the first application has been logged in to on the another mobile terminal by analyzing content of a second notification received from a server.

10. The mobile terminal according to claim 7, wherein determining whether the account of the first application has been logged in to on the another mobile terminal comprises:
    determining the account of the first application has been logged in to on the another mobile terminal in response to receiving an logged out instruction from a server.

11. The mobile terminal according to claim 7, wherein the processor is further configured to execute the instructions to:
    delete the first notification in response to importance of the first notification being higher than a preset threshold.

12. The mobile terminal according to claim 11, wherein the processor is further configured to execute the instructions to:
    receive a third notification corresponding to the first application when an account of the first application is logged in on the mobile terminal; and
    retain the third notification on the mobile terminal in response to importance of the third notification being lower than or equal to the preset threshold.

13. A computer-readable storage medium comprising instructions which, when executed by a mobile terminal, cause the mobile terminal to:
    receive a first notification corresponding to a first application when an account of the first application is logged in to on the mobile terminal;
    display the first notification;
    determine whether the account of the first application has been logged in to on another mobile terminal; and
    automatically in response to determining that the account of the first application has been logged in on the another mobile terminal, deleting the displayed first notification from the mobile terminal.

14. The computer-readable storage medium according to claim 13, wherein the instructions, when executed by the mobile terminal, further cause the mobile terminal to:
    obtain a user ID of the first application, wherein the user ID indicates the account of the first application.

15. The computer-readable storage medium according to claim 13, wherein determining whether the account of the first application has been logged in to on the another mobile terminal comprises:

determining whether the account of the first application has been logged in to on the another mobile terminal by analyzing content of a second notification receiving from a server.

16. The computer-readable storage medium according to claim 13, wherein determining whether the account of the first application has been logged in to on the another mobile terminal comprises:
determining the account of the first application has been logged in on the another mobile terminal in response to receiving a logged out instruction from a server.

17. The computer-readable storage medium according to claim 13, wherein the instructions, when executed by the mobile terminal, further cause the mobile terminal to:
delete the first notification in response to importance of the first notification being higher than a preset threshold.

18. The computer-readable storage medium according to claim 17, wherein the instructions, when executed by the mobile terminal, further cause the mobile terminal to:
receive a third notification corresponding to the first application when the account of the first application is logged in to on the mobile terminal; and
retain the third notification on the mobile terminal in response to importance of the third notification being lower than or equal to the preset threshold.

* * * * *